(12) United States Patent
Fujii

(10) Patent No.: US 12,526,318 B2
(45) Date of Patent: Jan. 13, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Masaru Fujii, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 548 days.

(21) Appl. No.: 17/897,210

(22) Filed: Aug. 28, 2022

(65) Prior Publication Data

US 2023/0308486 A1    Sep. 28, 2023

(30) Foreign Application Priority Data

Mar. 23, 2022 (JP) ................. 2022-047179

(51) Int. Cl.
*H04L 9/40* (2022.01)
*H04L 67/141* (2022.01)

(52) U.S. Cl.
CPC ............ *H04L 63/20* (2013.01); *H04L 63/108* (2013.01); *H04L 67/141* (2013.01)

(58) Field of Classification Search
CPC ...... H04L 63/20; H04L 63/108; H04L 67/141
USPC .......................................................... 726/1
See application file for complete search history.

(56) References Cited

U.S. PATENT DOCUMENTS

| | | | |
|---|---|---|---|
| 10,277,683 B2* | 4/2019 | Abuan | H04W 4/203 |
| 10,855,725 B2 | 12/2020 | Pai et al. | |
| 12,069,040 B2* | 8/2024 | Smith | H04L 67/12 |
| 2003/0177389 A1 | 9/2003 | Albert et al. | |
| 2006/0023738 A1* | 2/2006 | Sanda | H04L 43/045 |
| | | | 370/463 |

FOREIGN PATENT DOCUMENTS

| | | |
|---|---|---|
| EP | 1802071 | 6/2007 |
| JP | 6982006 | 12/2021 |
| WO | 2006004784 | 1/2006 |

OTHER PUBLICATIONS

Karimibiuki et al., 2018 IEEE, 23rd Pacific Rim International Symposium on Dependable Computing, "DynPolAC: Dynamic Policy-based Access Control for IoT Systems", pp. 161-170 (Year: 2018).*

"Search Report of Europe Counterpart Application", issued on Aug. 2, 2023, p. 1-p. 7.

* cited by examiner

*Primary Examiner* — Khalil Naghdali
(74) *Attorney, Agent, or Firm* — JCIPRNET

(57) ABSTRACT

An information processing apparatus includes a processor configured to: register, in a system in which a management policy for managing a safety of information is defined, as the management policy of an apparatus that is not connected to the system, restriction information indicating more restrictions than restriction imposed on an information resource of which the safety with respect to the system is guaranteed in a case where a connection request to the system is received from the apparatus; and enable a connection from the apparatus to the information resource connected to the system within a scope of the restriction indicated by the registered restriction information.

18 Claims, 18 Drawing Sheets

FIG. 6

| policy_id | resource | resource_id | permission_id | state | audited |
|---|---|---|---|---|---|
| pol_101 | pc | PC-Hanako | 4002 | enable | clear |
| pol_202 | pc | PC-Taro | 4003 | disable | clear |
| ... | ... | ... | ... | ... | ... |

FIG. 7

| policy_id | resource | resource_id | permission_id | state | audited |
|---|---|---|---|---|---|
| pol_101 | pc | PC-Hanako | 4002 | enable | clear |
| pol_202 | pc | PC-Taro | 4003 | disable | clear |
| pol_303 | printer | Printer-New | 4001 | enable | auditing |
| ... | ... | ... | ... | ... | ... |

FIG. 9

| token_id | scope | resource_id | expire | restriction | score_audit |
|---|---|---|---|---|---|
| token234xyz | read+write | PC-Hanako | 345600 | none | - |
| token567dfg | read+write | PC-Taro | 691200 | none | - |
| ... | ... | ... | ... | ... | ... |

FIG. 10

| token_id | scope | resource_id | expire | restriction | score_audit |
|---|---|---|---|---|---|
| token100abc | read | Printer-New | 86400 | auditing | 0 |
| token234xyz | read+write | PC-Hanako | 345600 | none | - |
| token567dfg | read+write | PC-Taro | 691200 | none | - |
| ... | ... | ... | ... | ... | ... |

FIG. 12

| token_id | scope | resource_id | expire | restriction | score_audit |
|---|---|---|---|---|---|
| token100abc | read | Printer-New | 86400 | auditing | 99 |
| token234xyz | read+write | PC-Hanako | 345600 | none | - |
| token567dfg | read+write | PC-Taro | 691200 | none | - |
| ... | ... | ... | ... | ... | ... |

FIG. 13

| token_id | scope | resource_id | expire | restriction | score_audit |
|---|---|---|---|---|---|
| token100abc | read+write | Printer-New | 86400 | none | 100 |
| token234xyz | read+write | PC-Hanako | 345600 | none | - |
| token567dfg | read+write | PC-Taro | 691200 | none | - |
| ... | ... | ... | ... | ... | ... |

FIG. 14

| policy_id | resource | resource_id | permission_id | state | audited |
|---|---|---|---|---|---|
| pol_101 | pc | PC-Hanako | 4002 | enable | clear |
| pol_202 | pc | PC-Taro | 4003 | disable | clear |
| pol_303 | printer | Printer-New | 4001 | enable | clear |
| ... | ... | ... | ... | ... | ... |

FIG. 15

| policy_id | resource | resource_id | permission_id | state | audited |
|---|---|---|---|---|---|
| pol_101 | pc | PC-Hanako | 4002 | enable | clear |
| pol_202 | pc | PC-Taro | 4003 | disable | clear |
| pol_303 | printer | Printer-New | 4001 | prohibition | violation |
| ... | ... | ... | ... | ... | ... |

FIG. 17

| token_id | scope | resource_id | expire | restriction | score_audit |
|---|---|---|---|---|---|
| token100abc | read* | Printer-New | 86400 | auditing Lv1 | 0 |
| token234xyz | read+write | PC-Hanako | 345600 | none | - |
| token567dfg | read+write | PC-Taro | 691200 | none | - |
| ... | ... | ... | ... | ... | ... |

FIG. 18

| token_id | scope | resource_id | expire | restriction | score_audit |
|---|---|---|---|---|---|
| token100abc | read | Printer-New | 86400 | auditing Lv2 | 50 |
| token234xyz | read+write | PC-Hanako | 345600 | none | - |
| token567dfg | read+write | PC-Taro | 691200 | none | - |
| ... | ... | ... | ... | ... | ... |

FIG. 19

| token_id | scope | resource_id | expire | restriction | score_audit |
|---|---|---|---|---|---|
| token100abc | read+write* | Printer-New | 86400 | auditing Lv3 | 80 |
| token234xyz | read+write | PC-Hanako | 345600 | none | - |
| token567dfg | read+write | PC-Taro | 691200 | none | - |
| ... | ... | ... | ... | ... | ... |

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-047179 filed Mar. 23, 2022.

BACKGROUND

(i) Technical Field

The present invention relates to an information processing apparatus, a non-transitory computer readable medium storing an information processing program, and an information processing method.

(ii) Related Art

JP6982006B describes a technique for enabling a container separated from a host operating system and permitting an application executing in the container to access unreliable network resources.

SUMMARY

In the related art, in a case of connecting a new apparatus to a system for which a management policy for managing the safety of information is defined, an administrator of the system performs an evaluation work on the new apparatus before the connection, and the connection is made after the safety of the new apparatus is confirmed by the evaluation work.

However, in the above evaluation work, for example, it takes a certain amount of time to complete the work, such as constructing a pseudo system that simulates the system and confirming the operation of a new apparatus in the pseudo system. Therefore, in the configuration in the related art, even in a case where a new apparatus is to be used quickly in the system, it is necessary to wait until the evaluation work is completed, and there is room for improvement.

Aspects of non-limiting embodiments of the present disclosure relate to an information processing apparatus, a non-transitory computer readable medium storing an information processing program, and an information processing method that, in a case of connecting a new apparatus to a system for which a management policy for managing the safety of information is defined, make it possible to connect the new apparatus to the system without performing evaluation work for the new apparatus before connecting to the system while considering the safety of the system.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: register, in a system in which a management policy for managing a safety of information is defined, as the management policy of an apparatus that is not connected to the system, restriction information indicating more restrictions than restriction imposed on an information resource of which the safety with respect to the system is guaranteed in a case where a connection request to the system is received from the apparatus; and enable a connection from the apparatus to the information resource connected to the system within a scope of the restriction indicated by the registered restriction information.

BRIEF DESCRIPTION OF THE DRAWINGS

Exemplary embodiment(s) of the present invention will be described in detail based on the following figures, wherein:

FIG. 6 is a first explanatory diagram of a policy management table;

FIG. 7 is a second explanatory diagram of the policy management table;

FIG. 9 is a first explanatory diagram of a token management table;

FIG. 10 is a second explanatory diagram of the token management table;

FIG. 12 is a third explanatory diagram of the token management table;

FIG. 13 is a fourth explanatory diagram of the token management table;

FIG. 14 is a third explanatory diagram of the policy management table;

FIG. 15 is a fourth explanatory diagram of the policy management table;

FIG. 17 is a fifth explanatory diagram of the token management table;

FIG. 18 is a sixth explanatory diagram of the token management table; and

FIG. 19 is a seventh explanatory diagram of the token management table.

DETAILED DESCRIPTION

Hereinafter, an information processing system 10 according to the present exemplary embodiment will be described.

First Exemplary Embodiment

First, a first exemplary embodiment of an information processing system 10 will be described.

Figure 1:
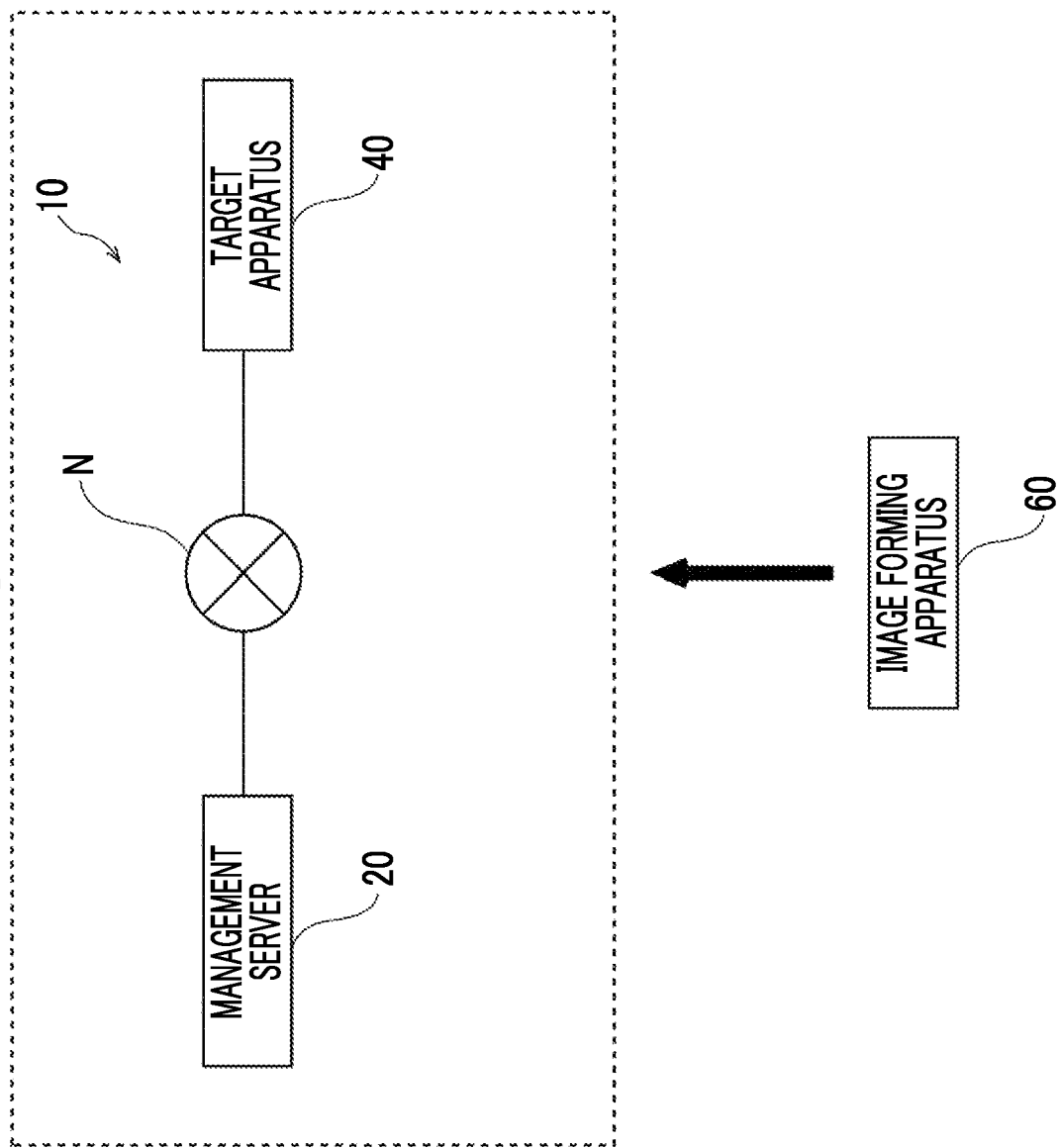
FIG. 1 is a first explanatory diagram showing a schematic configuration of an information processing system.

FIG. 1 is a first explanatory diagram showing a schematic configuration of the information processing system 10. The information processing system 10 is constructed on the basis of a so-called zero trust model, which regards any connection to an information resource as unreliable. As an example, in the information processing system 10, an access policy is defined for each information resource connected to the information processing system 10 as a management policy for managing the safety of information.

As shown in FIG. 1, the information processing system 10 includes a management server 20 and a target apparatus 40. The management server 20 and the target apparatus 40 are connected to each other via a network N and can communicate with each other. As an example, the Internet, a local area network (LAN), a wide area network (WAN), and the like are applied to this network N. Although only one target apparatus 40 is shown in FIG. 1, there are a plurality of target apparatuses.

The management server 20, which is an example of the information processing apparatus, manages the above access policy, determines whether or not there is an access right based on the access policy each time the management server is connected to an information resource connected to the information processing system 10, and decides whether or not the connection is possible. As an example, information resources include various apparatuses such as terminals, servers, and network devices, data, applications, services, and the like.

The target apparatus 40 is an apparatus to be connected in the information processing system 10. The target apparatus 40 is an example of "an information resource connected to the system".

Further, FIG. 1 shows an image forming apparatus 60 that is not connected to the information processing system 10. Hereinafter, a flow until the image forming apparatus 60 is connected to the information processing system 10 and a flow after the connection will be described. The image forming apparatus 60 is an example of "an apparatus not connected to the system".

Figure 2:
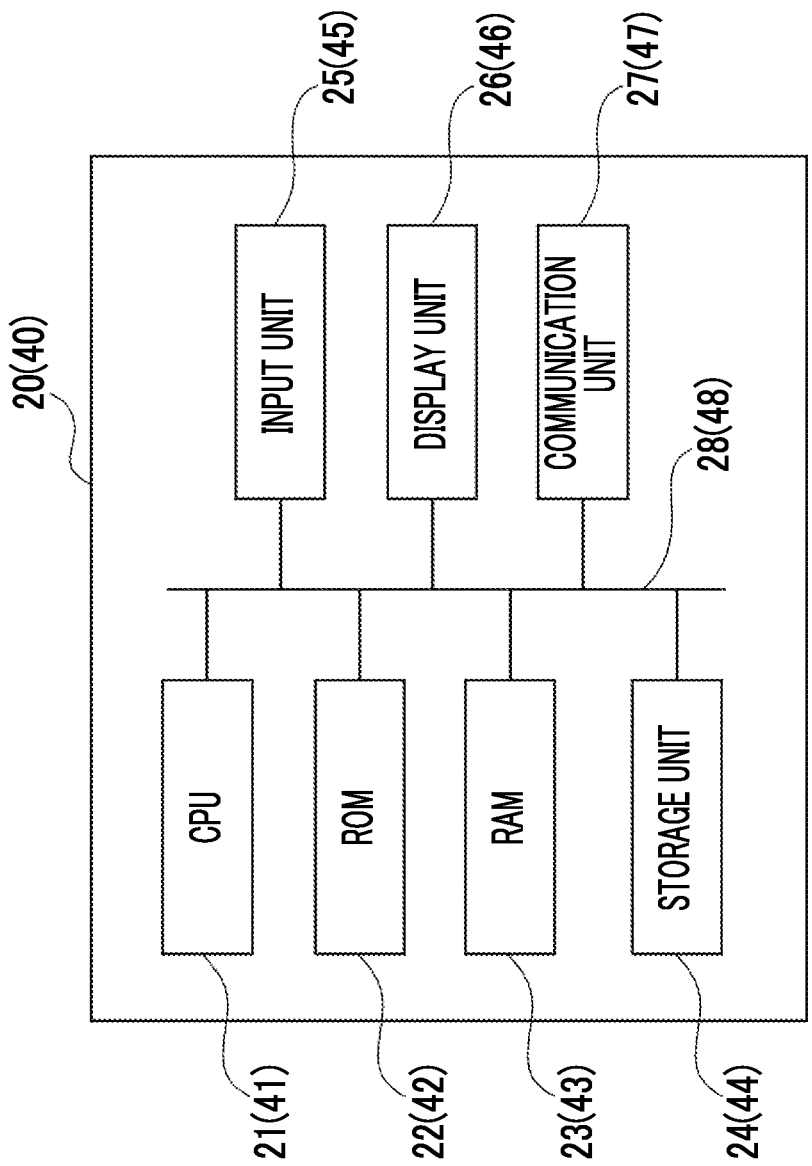
FIG. 2 is a block diagram showing a hardware configuration of a management server and a target apparatus.

FIG. 2 is a block diagram showing a hardware configuration of the management server 20 and the target apparatus 40. In the first exemplary embodiment, the management server 20 is a "server computer" and the target apparatus 40 is a "personal computer (PC)". Note that, since the management server 20 and the target apparatus 40 basically have a general computer configuration, the management server 20 will be described as a representative.

As shown in FIG. 2, the management server 20 includes a central processing unit (CPU) 21, a read only memory (ROM) 22, a random access memory (RAM) 23, a storage unit 24, an input unit 25, a display unit 26, and a communication unit 27. Each configuration is communicably connected to each other via a bus 28.

The CPU 21 is a central arithmetic processing unit that executes various programs and controls each unit. That is, the CPU 21 reads the program from the ROM 22 or the storage unit 24, and executes the program using the RAM 23 as a work area. The CPU 21 controls each of the above configurations and performs various arithmetic processes according to the program stored in the ROM 22 or the storage unit 24. The ROM 22 or the storage unit 24 stores at least an information processing program for executing a connection process, an issuance process, and a decision process, which will be described later. The information processing program may be pre-installed on the management server 20, or may be appropriately installed on the management server 20 by being stored in a non-volatile storage medium or being distributed via the network N. Examples of the non-volatile storage medium include a CD-ROM, a magneto-optical disc, a hard disk drive (HDD), a DVD-ROM, a flash memory, a memory card, and the like. The CPU 21 is an example of a "processor".

The ROM 22 stores various programs and various data. The RAM 23 temporarily stores a program or data as a work area.

The storage unit 24 is composed of a storage device such as an HDD, a solid state drive (SSD), or a flash memory, and stores various programs including an operating system and various data.

As an example, the input unit 25 includes a pointing device such as a mouse, various buttons, a keyboard, a microphone, a camera, and the like, and is used for performing various inputs.

As an example, the display unit 26 is a liquid crystal display and displays various information. The display unit 26 may employ a touch panel method and function as the input unit 25.

The communication unit 27 is an interface for communicating with other devices. For the communication, for example, a wired communication standard such as Ethernet (registered trademark) or FDDI, or a wireless communication standard such as 4G, 5G, or Wi-Fi (registered trademark) is used.

In the case of executing the above information processing program, the management server 20 uses the above hardware resources to execute processing based on the information processing program.

Figure 3:
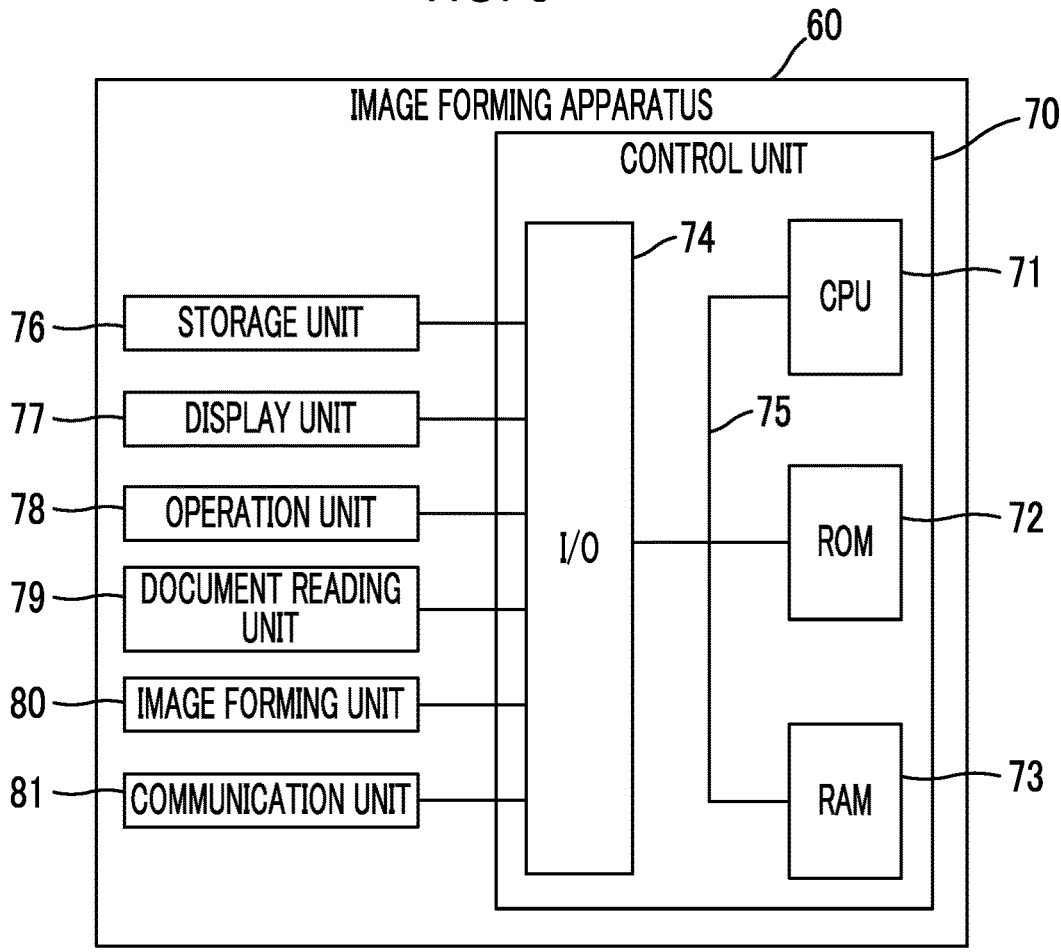
FIG. 3 is a block diagram showing a hardware configuration of an image forming apparatus.

FIG. 3 is a block diagram showing a hardware configuration of the image forming apparatus 60.

As shown in FIG. 3, the image forming apparatus 60 includes a control unit 70 that controls the operation of the image forming apparatus 60. In the control unit 70, a CPU 71, a ROM 72, a RAM 73, and an I/O 74 are connected to each other via a bus 75 so as to be communicable with each other.

The CPU 71 is a central arithmetic processing unit that executes various programs and controls each unit. That is, the CPU 71 reads the program from the ROM 72 or the storage unit 76 to be described later, and executes the program using the RAM 73 as a work area. The CPU 71 controls each of the above configurations and performs various arithmetic processes according to the program stored in the ROM 72 or the storage unit 76.

The ROM 72 stores various programs and various data. The RAM 73 temporarily stores a program or data as a work area.

The storage unit 76, a display unit 77, an operation unit 78, a document reading unit 79, an image forming unit 80, and a communication unit 81 are connected to the I/O 74. Each of these units can communicate with the CPU 71 via the I/O 74.

The storage unit 76 is composed of a storage device such as an HDD, an SSD, or a flash memory, and stores various programs and various data.

For the display unit 77, for example, a liquid crystal display, an organic electroluminescence (EL) display, or the like is used. The display unit 77 integrally has a touch panel.

The operation unit 78 is provided with various operation keys such as a numeric keypad or a start key.

The display unit 77 and the operation unit 78 receive various instructions from a user of the image forming apparatus 60. These various instructions include, for example, an instruction to start reading the document, an instruction to start copying the document, and the like. The display unit 77 displays various information such as a result of the process executed in response to the instruction received from the user and a notification for the process.

The document reading unit 79 reads documents placed on a paper feed tray of an automatic document feeder (not shown) provided in the upper part of the image forming apparatus 60 one by one, and optically reads the read documents to obtain image information. Alternatively, the document reading unit 79 optically reads the document placed on a document stand such as platen glass to obtain image information.

The image forming unit 80 forms an image based on the image information obtained by reading by the document reading unit 79 or image information obtained from an external PC or the like connected via the network N on a recording medium such as paper.

The communication unit 81 is an interface for communicating with other devices. For the communication, for example, a wired communication standard such as Ethernet (registered trademark) or FDDI, or a wireless communication standard such as 4G, 5G, or Wi-Fi (registered trademark) is used.

Figure 4:
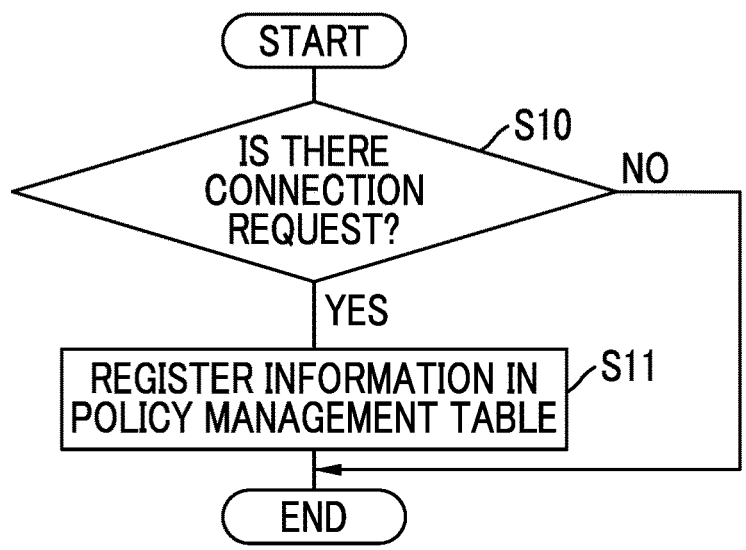
FIG. 4 is a flowchart showing a flow of a connection process by a management server.

FIG. 4 is a flowchart showing a flow of a connection process that enables the management server 20 to connect the image forming apparatus 60 to the target apparatus 40. The connection process is performed by the CPU 21 reading an information processing program from the ROM 22 or the storage unit 24, loading the information processing program into the RAM 23, and executing the information processing program.

In step S10 shown in FIG. 4, the CPU 21 determines whether or not a connection request from the image forming apparatus 60 to the target apparatus 40 has been received, and in a case where it is determined that the connection request has been received (step S10: YES), the process proceeds to step S11. On the other hand, in a case where the CPU 21 determines that the connection request from the image forming apparatus 60 to the target apparatus 40 has not been received (step S10: NO), the connection process ends. As an example, the CPU 21 determines that the connection request has been received in a case where the connection request transmitted from the image forming apparatus 60 has been acquired, and determines that the connection request has not been received in a case where the connection request has not been acquired. As an example, the connection request includes information indicating the target apparatus 40 for which connection is desired.

In step S11, the CPU 21 registers information regarding the access policy of the image forming apparatus 60 that has received the connection request in step S10 in a policy management table stored in the storage unit 24. Thereby, the image forming apparatus 60 can be connected to the target apparatus 40 within the scope of restrictions to be described later. Then, the connection process ends. In the first exemplary embodiment, after the image forming apparatus 60 is connected to the information processing system 10, single sign-on by token authentication represented by OAuth 2.0 is applied.

Figure 5:
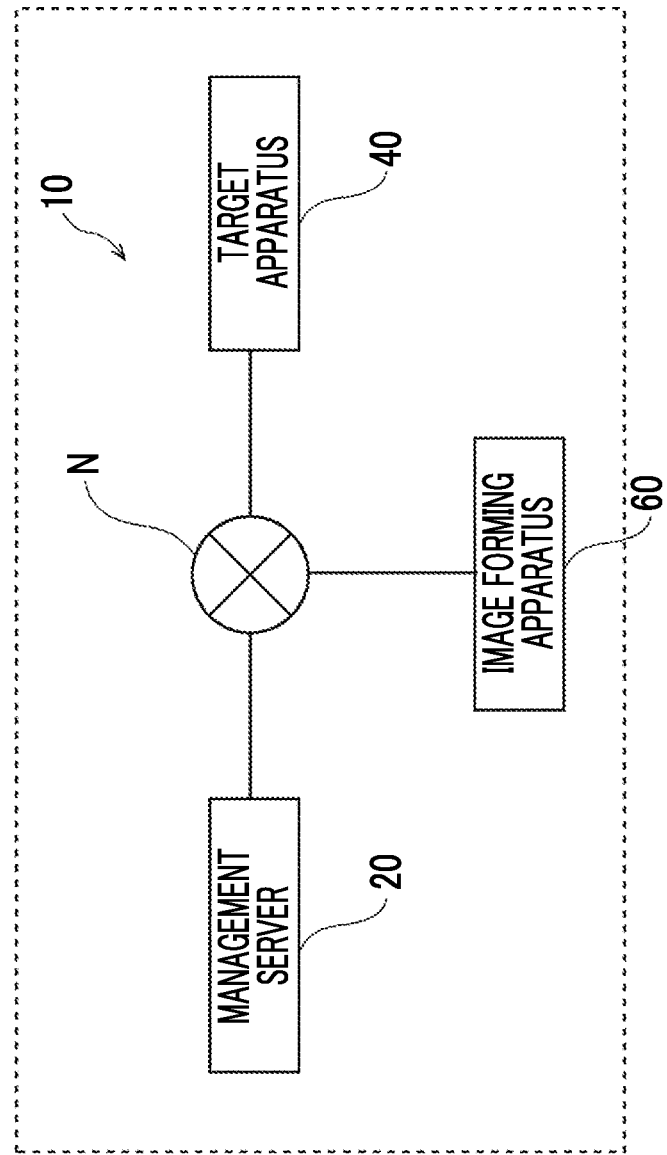
FIG. 5 is a second explanatory diagram showing a schematic configuration of the information processing system.

FIG. 5 is a second explanatory diagram showing a schematic configuration of the information processing system 10. Specifically, FIG. 5 shows a schematic configuration of the information processing system 10 in which the connection process shown in FIG. 4 is performed and the image forming apparatus 60 can be connected to the target apparatus 40.

As shown in FIG. 5, the information processing system 10 includes the management server 20, the target apparatus 40, and the image forming apparatus 60. The management server 20, the target apparatus 40, and the image forming apparatus 60 are connected to each other via the network N and can communicate with each other.

Next, a specific example of the above policy management table will be described.

FIG. 6 is a first explanatory diagram of a policy management table that manages access policies for information resources connected to the information processing system 10.

As shown in FIG. 6, the policy management table includes a plurality of records. Then, in the column of each record, information regarding the access policy corresponding to a plurality of predetermined items is displayed. As an example, the policy management table includes a plurality of items of "policy_id", "resource", "resource_id", "permission_id", "state", and "audited".

The item "policy_id" is a part that displays identification information for specifying each record of the policy management table.

The item "resource" is a part that displays an information resource corresponding to each record of the policy management table.

The item "resource_id" is a part that displays identification information for specifying the information resource corresponding to each record of the policy management table.

The item "permission_id" is a part that displays foreign keys of other tables related to the policy management table.

The item "state" is a part that displays a state of an access policy of the information resource corresponding to each record of the policy management table. As an example, in the item "state", any of "enable" indicating that an access policy is valid, "disable" indicating that an access policy is invalid, and "prohibition" indicating that an access policy is prohibited is displayed.

The item "audited" is a part that displays restriction information for the information resource corresponding to each record of the policy management table. As an example, in the item "audited", any of "clear" indicating an unrestricted state in which a restriction is not imposed, "auditing" indicating a restricted state in which a restriction is imposed, and "violation" indicating a violation state in which the imposed restriction is violated is displayed. Here, the information resource corresponding to records in which the item "policy_id" shown in FIG. 6 is "pol_101" and "pol_202" is the target apparatus 40 of which the safety with respect to the information processing system 10 is guaranteed. Therefore, "clear" is displayed in the item "audited" of the record.

FIG. 7 is a second explanatory diagram of the policy management table. The policy management table shown in FIG. 7 shows a state after a record in which the item "policy_id" is "pol_303" is registered in the policy management table shown in FIG. 6. Here, the information resource corresponding to the record is the image forming apparatus 60 that has transmitted the connection request to the management server 20 in the connection process shown in FIG. 4. In a case where the CPU 21 of the management server 20 registers information regarding the access policy of the image forming apparatus 60 in the policy management table, the CPU 21 of the management server 20 registers restriction information indicating more restrictions than the restriction imposed on the target apparatus 40 of which the safety with respect to the information processing system 10 is guaranteed. As an example, the CPU 21 registers the restriction information of the image forming apparatus 60 in the restricted state. Therefore, as shown in FIG. 7, "auditing" is displayed in the item "audited" of the record.

Next, the flow after connecting the image forming apparatus 60 to the information processing system 10 will be described.

Figure 8:
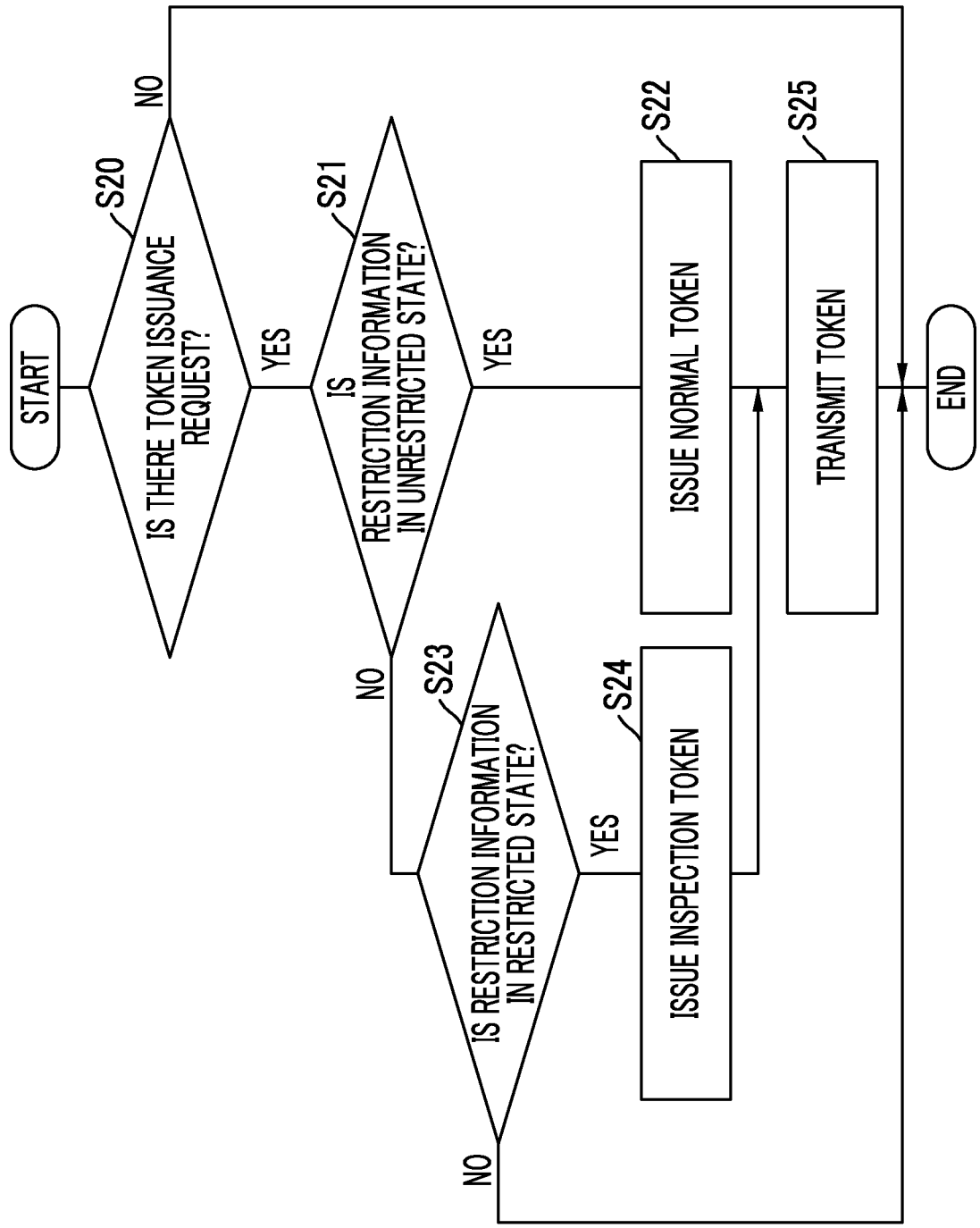
FIG. 8 is a flowchart showing a flow of an issuance process by the management server.

FIG. 8 is a flowchart showing the flow of the issuance process for issuing an access token by the management server 20. The issuance process is performed by the CPU 21 reading an information processing program from the ROM 22 or the storage unit 24, loading the information processing program into the RAM 23, and executing the information processing program.

In step S20 shown in FIG. 8, the CPU 21 determines whether or not an access token issuance request has been received from the image forming apparatus 60, and in a case where it is determined that the issuance request has been received (step S20: YES), the process proceeds to step S21. On the other hand, in a case where the CPU 21 determines that the access token issuance request has not been received from the image forming apparatus 60 (step S20: NO), the issuance process ends. As an example, the CPU 21 determines that the issuance request has been received in a case where the issuance request transmitted from the image forming apparatus 60 has been acquired, and determines that the issuance request has not been received in a case where the issuance request has not been acquired.

In step S21, the CPU 21 refers to the policy management table, and determines whether or not the restriction information of the image forming apparatus 60 is in the unrestricted state, and in a case where it is determined that the restriction information is in the unrestricted state (step S21: YES), the process proceeds to step S22. On the other hand, in a case where the CPU 21 determines that the restriction information of the image forming apparatus 60 is not in the unrestricted state (step S21: NO), the process proceeds to step S23.

In step S22, the CPU 21 issues a normal token as an access token, and registers the issued access token in a token management table stored in the storage unit 24. Then, the process proceeds to step S25.

In step S23, the CPU 21 refers to the policy management table, and determines whether or not the restriction information of the image forming apparatus 60 is in the restricted state, and in a case where it is determined that the restriction information is in the restricted state (step S23: YES), the process proceeds to step S24. On the other hand, in a case where the CPU 21 determines that the restriction information of the image forming apparatus 60 is not in the restricted state (step S23: NO), the issuance process ends.

In step S24, the CPU 21 issues an inspection token as an access token, and registers the issued access token in the token management table stored in the storage unit 24. Then, the process proceeds to step S25.

In step S25, the CPU 21 transmits the issued access token to the image forming apparatus 60. Then, the issuance process ends. In the first exemplary embodiment, as an example, the entity structure of the access token is configured by "identifier type".

Next, a specific example of the above token management table will be described.

FIG. 9 is a first explanatory diagram of a token management table that manages access tokens for information resources connected to the information processing system 10.

As shown in FIG. 9, the token management table includes a plurality of records. Then, in the column of each record, information regarding the access token corresponding to a plurality of predetermined items is displayed. As an example, the token management table includes a plurality of items of "token_id", "scope", "resource_id", "expire", "restriction", and "score_audit".

The item "token_id" is a part that displays identification information for specifying each record of the token management table.

The item "scope" is a part that displays an authorized authority of the information resource corresponding to each record of the token management table. As an example, in the item "scope", any of "read" indicating that information can be read, "write" indicating that information can be written, and "read+write" indicating that information can be read and written is displayed.

The item "resource_id" is a part that displays identification information for specifying the information resource corresponding to each record of the token management table.

The item "expire" is a part that displays information regarding an expiration date of the access token.

The item "restriction" is a part that displays a restriction for the information resource corresponding to each record of the token management table. As an example, in the item "restriction", either "none" indicating that a restriction is not imposed or "auditing" indicating that a restriction is imposed is displayed. In a case where the CPU 21 of the management server 20 issues a normal token as an access token, the CPU registers the item "restriction" with "none", and in a case where the CPU issues an inspection token as an access token, the CPU registers the item "restriction" with "auditing".

The item "score_audit" is a part that displays an evaluation value that evaluates the safety of information resources in a case where an inspection token is issued as an access token. In a case where a normal token is issued as an access token, "-" is displayed in the item "score_audit" instead of the evaluation value. A specific example of the display content of the item "score_audit" will be described later.

FIG. 10 is a second explanatory diagram of the token management table. The token management table shown in FIG. 10 shows a state after a record in which the item "token_id" is "token100abc" is registered in the token management table shown in FIG. 9. Here, the information resource corresponding to the record is the image forming apparatus 60 that has transmitted the issuance request to the management server 20 in the issuance process shown in FIG. 8. Therefore, the CPU 21 of the management server 20 issues an inspection token as an access token, and registers the item "restriction" of the record with "auditing" and the item "score_audit" thereof with the initial value "0".

Figure 11:
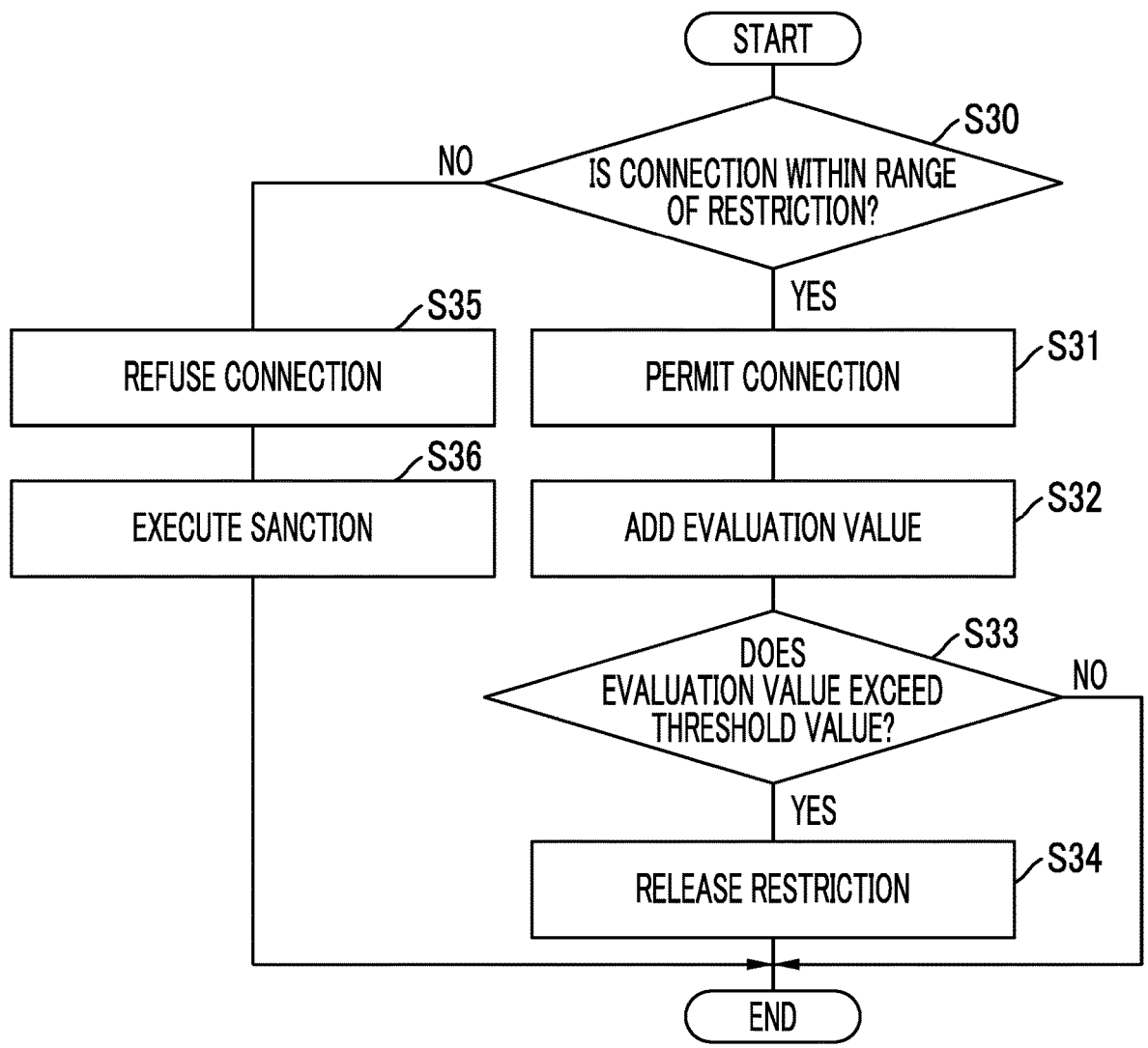
FIG. 11 is a first flowchart showing a flow of a decision process by the management server.

FIG. 11 is a first flowchart showing a flow of a decision process for deciding whether or not to permit connection from the image forming apparatus 60 to the target apparatus 40 by the management server 20. The decision process is performed by the CPU 21 reading an information processing program from the ROM 22 or the storage unit 24, loading the information processing program into the RAM 23, and executing the information processing program.

In step S30 shown in FIG. 11, the image forming apparatus 60 makes a connection request to the target apparatus 40 together with the access token issued and received by the management server 20. The target apparatus 40 acquires the access token included in the connection request from the image forming apparatus 60, and requests the management server 20 for verification. The CPU 21 determines whether or not the connection from the image forming apparatus 60 to the target apparatus 40 is within the scope of the restriction imposed on the image forming apparatus 60, and in a case where it is determined that the connection is within the scope of the restriction (step S30: YES), the process proceeds to step S31. On the other hand, in a case where the CPU 21 determines that the connection from the image forming apparatus 60 to the target apparatus 40 is not within the scope of the restriction imposed on the image forming apparatus 60 (step S30: NO), the process proceeds to step S35. The scope of the restriction includes, for example, the scope of authorized authority (eg, reading information only), the scope of the authorized target apparatus 40 (eg, PC only), and the like.

In step S31, the CPU 21 permits the connection from the image forming apparatus 60 to the target apparatus 40. Then, the process proceeds to step S32.

In step S32, the CPU 21 adds the evaluation value of the image forming apparatus 60 by a predetermined value. Then, the process proceeds to step S33.

In step S33, the CPU 21 determines whether or not the evaluation value of the image forming apparatus 60 exceeds a threshold value, and in a case where it is determined that the evaluation value exceeds the threshold value (step S33: YES), the process proceeds to step S34. On the other hand, in a case where the CPU 21 determines that the evaluation value of the image forming apparatus 60 does not exceed the threshold value (step S33: NO), the decision process ends. In the first exemplary embodiment, as an example, the threshold value is set to "99". The threshold value is not limited to the above value and may be larger or smaller than the above value.

In step S34, the CPU 21 releases the restriction imposed on the image forming apparatus 60. As an example, the CPU 21 updates the item "audited" of the policy management table to "clear", the item "scope" of the token management table to "read+write", and the item "restriction" to "none". Then, the decision process ends.

In step S35, the CPU 21 refuses the connection from the image forming apparatus 60 to the target apparatus 40. Then, the process proceeds to step S36.

In step S36, the CPU 21 execute a sanction on the image forming apparatus 60. As an example, the CPU 21 updates the item "state" of the policy management table to "prohibition" and the item "audited" to "violation". Further, the CPU 21 deletes the record corresponding to the image forming apparatus 60 from the token management table. In addition, the CPU 21 causes the identification information of the image forming apparatus 60 to be registered in a blacklist of a proxy server, a router, or the like connected to the information processing system 10. By executing the sanction, the subsequent connection from the image forming apparatus 60 to the target apparatus 40 is prohibited, and the connection from the image forming apparatus 60 to the outside of the information processing system 10 is prohibited. Then, the decision process ends.

Next, a specific example of the token management table and the policy management table in the case where the process proceeds to YES in step S30 shown in FIG. 11 will be described.

FIG. 12 is a third explanatory diagram of the token management table. The token management table shown in FIG. 12 shows a state in which the evaluation value of the image forming apparatus 60 is added from the token management table shown in FIG. 10. Specifically, in FIG. 12, the item "score_audit" of the record in which the item "token_id" corresponding to the image forming apparatus 60 is "token100abc" is the above threshold value "99".

FIG. 13 is a fourth explanatory diagram of the token management table. The token management table shown in FIG. 13 shows a state in which the evaluation value of the image forming apparatus 60 is added from the token management table shown in FIG. 12, and exceeds the threshold value. Specifically, in FIG. 13, the item "score_audit" of the record in which the item "token_id" corresponding to the image forming apparatus 60 is "token100abc" is "100". Thereby, in the token management table shown in FIG. 13, the item "scope" of the record is updated to "read+write", and the item "restriction" thereof is updated to "none".

FIG. 14 is a third explanatory diagram of the policy management table. In the policy management table shown in FIG. 14, the item "audited" of the record in which the item "policy_id" is "pol_303" is updated to "clear" from the policy management table shown in FIG. 7 based on the fact that the restriction imposed on the image forming apparatus 60 is released in step S34 shown in FIG. 11.

Next, a specific example of the policy management table in the case where the process proceeds to NO in step S30 shown in FIG. 11 will be described.

FIG. 15 is a fourth explanatory diagram of the policy management table. In the policy management table shown in FIG. 15, the item "state" of the record in which the item "policy_id" is "pol_303" is updated to "prohibition" and the item "audited" thereof is updated to "violation" from the policy management table shown in FIG. 7 based on the fact that the sanction is executed on the image forming apparatus 60 in step S36 shown in FIG. 11.

As described above, in the first exemplary embodiment, in a case where the CPU 21 receives a connection request from the image forming apparatus 60 to the information processing system 10 in the information processing system 10 for which an access policy is defined, the CPU 21 registers restriction information indicating more restrictions than the restriction imposed on the target apparatus 40 of which the safety with respect to the information processing system 10 is guaranteed as the access policy of the image forming apparatus 60. Then, the CPU 21 enables the connection from the image forming apparatus 60 to the target apparatus 40 within the scope of the restriction indicated by the registered restriction information. Thereby, according to the first exemplary embodiment, in a case of connecting the image forming apparatus 60 to the information processing system 10 for which an access policy is defined, it is possible to connect the image forming apparatus 60 to the information processing system 10 without performing evaluation work for the image forming apparatus 60 before connecting to the information processing system 10 while considering the safety of the information processing system 10.

Further, in the first exemplary embodiment, the restriction information indicates a restricted state in which the restriction is imposed or an unrestricted state in which the restriction is not imposed. Then, in a case of registering the restriction information of the image forming apparatus 60, the CPU 21 sets the restriction information as the restricted state. Thereby, according to the first exemplary embodiment, the image forming apparatus 60 may be connected to the information processing system 10 with more restrictions than the restriction imposed on the target apparatus 40 of which the safety with respect to the information processing system 10 is guaranteed.

Further, in the first exemplary embodiment, the CPU 21 updates the restriction information of the image forming apparatus 60 from the restricted state to the unrestricted state in a case where a predetermined condition is satisfied. Thereby, according to the first exemplary embodiment, in a case where the safety of the image forming apparatus 60 with respect to the information processing system 10 is guaranteed, the restriction imposed on the image forming apparatus 60 may be released.

Further, in the first exemplary embodiment, the predetermined condition is satisfied in a case where the total of the evaluation values for evaluating the safety of the image forming apparatus 60 exceeds the threshold value. Thereby, according to the first exemplary embodiment, the safety of the image forming apparatus 60 with respect to the information processing system 10 may be evaluated by using the evaluation value.

Further, in the first exemplary embodiment, the CPU 21 adds the evaluation value in a case where the connection to the target apparatus 40 made by the image forming apparatus 60 is within the scope of the restriction indicated by the restriction information. Thereby, according to the first exemplary embodiment, the more the image forming apparatus 60 connects to the target apparatus 40 within the scope of the restriction, the faster the restriction imposed on the image forming apparatus 60 may be released.

Further, in the first exemplary embodiment, the CPU 21 makes the evaluation value to be added different depending on the content of the connection to the target apparatus 40 made by the image forming apparatus 60. As an example, the CPU 21 may add the evaluation value only up to a predetermined number of times for the connection of the same content to the identical target apparatus 40, in a case where the requested connection content is "write", the CPU 21 may add a larger number of evaluation values than a case where the requested connection content is "read", or the CPU 21 may make the evaluation value to be added different for each target apparatus 40 desired to be connected. Thereby, according to the first exemplary embodiment, the degree of progress until the restriction imposed on the image forming apparatus 60 is released may be changed according to the content of the connection to the target apparatus 40 made by the image forming apparatus 60 within the scope of the restriction.

Further, in the first exemplary embodiment, the CPU 21 prohibits a subsequent connection from the image forming apparatus 60 to the target apparatus 40 in a case where the connection to the target apparatus 40 made by the image forming apparatus 60 is outside the scope of the restriction indicated by the restriction information. Thereby, according to the first exemplary embodiment, in a case where the restriction imposed on the image forming apparatus 60 is violated, the image forming apparatus 60 may execute the processing at the time of the violation.

Further, in the first exemplary embodiment, the CPU 21 prohibits a connection to the target apparatus 40 from other apparatuses of the same type as the image forming apparatus 60. The other apparatuses of the same type as the image forming apparatus 60 are, for example, another image forming apparatus having the same model number as the image forming apparatus 60, another image forming apparatus having a function similar to the function of the image forming apparatus 60, and the like. Thereby, according to the first exemplary embodiment, it is possible to prevent other apparatuses of the same type as the image forming apparatus 60 that violates the restriction from violating the restriction imposed in a case of connecting to the information processing system 10.

Further, in the first exemplary embodiment, the CPU 21 prohibits a subsequent connection from the image forming apparatus 60 to the outside of the information processing system 10 in a case where the connection to the target apparatus 40 made by the image forming apparatus 60 is outside the scope of the restriction indicated by the restriction information. Thereby, according to the first exemplary embodiment, it is possible to prevent the image forming apparatus 60 that violates the restriction from taking out the information acquired by the information processing system 10 to the outside of the information processing system 10.

Second Exemplary Embodiment

Next, a second exemplary embodiment of the information processing system 10 will be described while omitting or simplifying the overlapping portion with the other exemplary embodiments.

In the second exemplary embodiment, the predetermined condition for updating the restriction information of the image forming apparatus 60 from the restricted state to the unrestricted state is satisfied in a case where all connections to the target apparatus 40 made by the image forming apparatus 60 from a time at which the connection to the target apparatus 40 is enabled until a predetermined time elapses are within the scope of the restriction indicated by the restriction information. In the second exemplary embodiment, as an example, a predetermined time is set to "100 hours". The predetermined time is not limited to the above time, and may be longer or shorter than the time.

Figure 16:
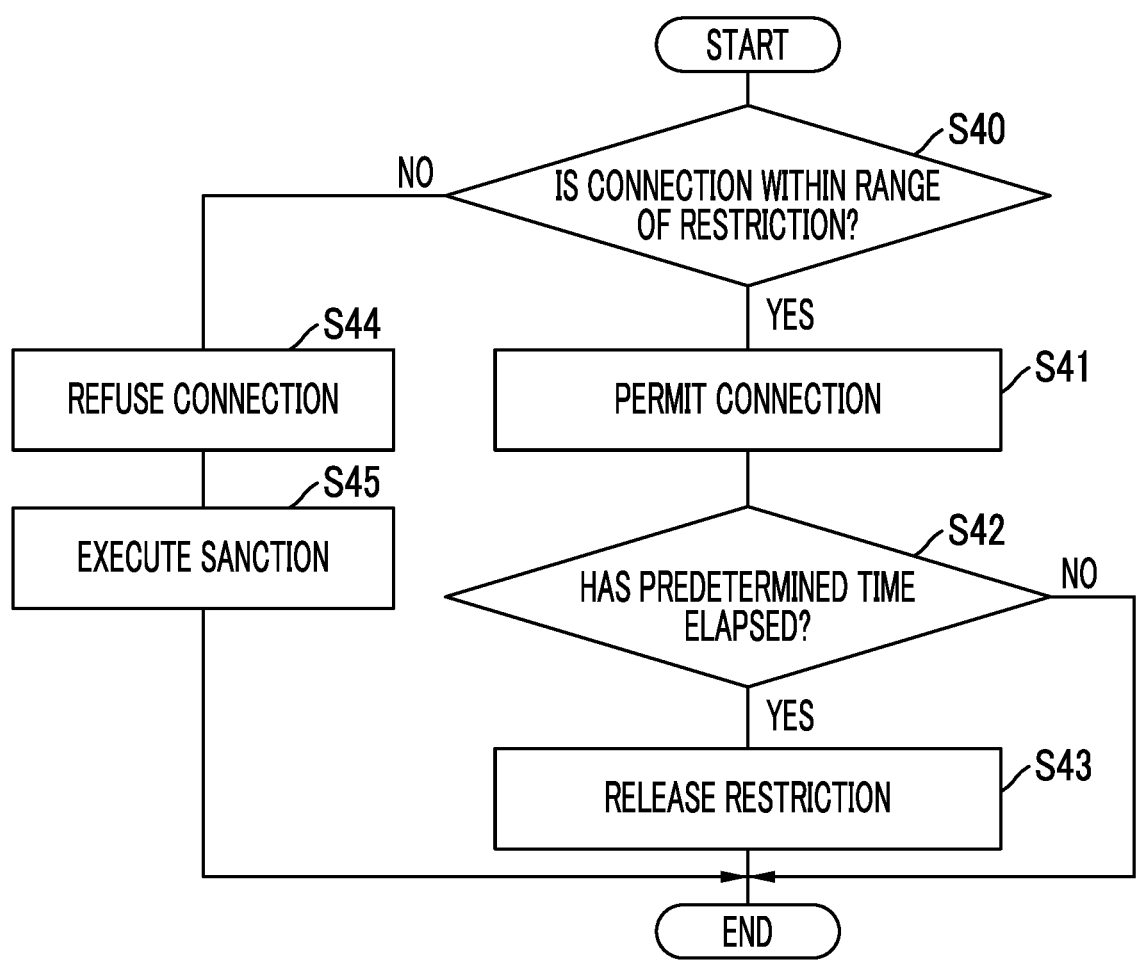
FIG. 16 is a second flowchart showing a flow of a decision process by the management server.

FIG. 16 is a second flowchart showing a flow of a decision process by the management server 20.

In step S40 shown in FIG. 16, the CPU 21 determines whether or not the connection from the image forming apparatus 60 to the target apparatus 40 is within the scope of the restriction imposed on the image forming apparatus 60, and in a case where it is determined that the connection is within the scope of the restriction (step S40: YES), the process proceeds to step S41. On the other hand, in a case where the CPU 21 determines that the connection from the image forming apparatus 60 to the target apparatus 40 is not within the scope of the restriction imposed on the image forming apparatus 60 (step S40: NO), the process proceeds to step S44.

In step S41, the CPU 21 permits the connection from the image forming apparatus 60 to the target apparatus 40. Then, the process proceeds to step S42.

In step S42, the CPU 21 determines whether or not a predetermined time has elapsed since the connection to the target apparatus 40 is enabled, and in a case where it is determined that the predetermined time has elapsed (step S42: YES), the process proceeds to step S43. On the other hand, in a case where the CPU 21 determines that the predetermined time has not elapsed since the connection to the target apparatus 40 is enabled (step S42: NO), the decision process ends.

In step S43, the CPU 21 releases the restriction imposed on the image forming apparatus 60. Then, the decision process ends.

In step S44, the CPU 21 refuses the connection from the image forming apparatus 60 to the target apparatus 40. Then, the process proceeds to step S45.

In step S45, the CPU 21 execute a sanction on the image forming apparatus 60. Then, the decision process ends.

With the above configuration, according to the second exemplary embodiment, the safety of the image forming apparatus 60 with respect to the information processing system 10 may be evaluated by using the content of the connection to the target apparatus 40 made by the image forming apparatus 60.

Third Exemplary Embodiment

Next, a third exemplary embodiment of the information processing system 10 will be described while omitting or simplifying the overlapping portion with the other exemplary embodiments.

In the third exemplary embodiment, a plurality of restrictions having slightly different restrictions are provided. Then, the CPU 21 gradually changes from the apparatus with many restrictions to the apparatus with few restrictions according to a degree of satisfaction of the predetermined condition. The plurality of restrictions include, for example, a first restriction, a second restriction that is less restricted than the first restriction, and a third restriction that is less restricted than the second restriction. As an example, in the third exemplary embodiment, the degree of satisfaction of the predetermined condition is determined by the total of evaluation values, and in a case where the total of evaluation values is "0 or more and less than 50", a "first restriction" is imposed, in a case where the total of evaluation values is "50 or more and less than 80", a "second restriction" is imposed, and in a case where the total of evaluation values is "80 or more and less than 100", a "third restriction" is imposed. The degree of satisfaction of the predetermined conditions is not limited to determining the total of evaluation values, and may be determined by the elapsed time since the connection to the target apparatus 40 is enabled.

FIG. 17 is a fifth explanatory diagram of the token management table. Similarly to the token management table shown in FIG. 10, the token management table shown in FIG. 17 shows a state after information regarding an access token of the image forming apparatus 60 that has transmitted an issuance request to the management server 20 is registered in the token management table.

Here, in the third exemplary embodiment, the display contents of the item "scope" and the item "restriction" of the token management table are different from the display contents of the other exemplary embodiments.

As an example, in the item "scope" in the third exemplary embodiment, any of "read*" indicating that some information can be read, "read" indicating that all information can be read, "read+write*" indicating that some information can be read and written, and "read+write" indicating that all information can be read and written is displayed.

As an example, in the item "restriction" in the third exemplary embodiment, any of "none" indicating that a restriction is not imposed, "auditing Lv1" indicating that a first restriction is imposed, "auditing Lv2" indicating that a second restriction is imposed, and "auditing Lv3" indicating that a third restriction is imposed is displayed.

Here, in FIG. 17, the information resource corresponding to the record in which the item "token_id" is "token100abc" is the image forming apparatus 60 that has transmitted the issuance request to the management server 20 in the issuance process shown in FIG. 8. In a case where the CPU 21 of the management server 20 registers an inspection token of the image forming apparatus 60 in the token management table, the CPU 21 of the management server 20 registers the item "scope" of the record with "read*", the item "restriction" thereof with "auditing Lv1", and the item "score_audit" thereof with the initial value "0".

FIG. 18 is a sixth explanatory diagram of the token management table. The token management table shown in FIG. 18 shows a state in which the evaluation value of the image forming apparatus 60 is added from the token management table shown in FIG. 17. Specifically, in FIG. 18, the item "score_audit" of the record in which the item "token_id" corresponding to the image forming apparatus 60 is "token100abc" is "50". Thereby, in the token management table shown in FIG. 18, the item "scope" of the record is updated to "read", and the item "restriction" thereof is updated to "auditing Lv2".

FIG. 19 is a seventh explanatory diagram of the token management table. The token management table shown in FIG. 19 shows a state in which the evaluation value of the image forming apparatus 60 is added from the token management table shown in FIG. 18. Specifically, in FIG. 19, the item "score_audit" of the record in which the item "token_id" corresponding to the image forming apparatus 60 is "token100abc" is "80". Thereby, in the token management table shown in FIG. 19, the item "scope" of the record is updated to "read+write*", and the item "restriction" thereof is updated to "auditing Lv3". In the third exemplary embodiment, in a case where the item "score_audit" of the record becomes "100", as in other exemplary embodiments, the item "scope" is updated to "read+write" and the item "restriction" is updated to "none".

With the above configuration, according to the third exemplary embodiment, the restrictions imposed on the image forming apparatus 60 may be gradually released.

Others

In the above exemplary embodiments, the access policy is defined as the management policy, but instead of or in addition to this, communication path encryption, multi-factor authentication, or the like may be applied as the management policy.

In the above exemplary embodiments, the management server 20 is used as an example of the information processing apparatus, but the present invention is not limited thereto, a plurality of servers may be used an example of the information processing apparatus, and a connection process, an issuance process, and a decision process may be distributed among the servers.

In the above exemplary embodiments, the image forming apparatus 60 is used as an example of an apparatus not connected to the system, but the present invention is not limited thereto, and other apparatuses such as a PC and a smartphone may be used as an example of an apparatus not connected to the system.

In the above exemplary embodiments, the target apparatus 40, which is an example of the information resource connected to the system, is a PC, but the present invention is not limited thereto, and the target apparatus 40 may be another apparatus such as a server computer and an image forming apparatus.

In each of the above exemplary embodiments, the CPU 21 may transmit information regarding the presence/absence of restrictions to the image forming apparatus 60, and display the presence/absence of restrictions imposed on the image forming apparatus 60 on the display unit 77.

In the above exemplary embodiments, in a case where a restriction is imposed on the image forming apparatus 60, when the image forming apparatus 60 makes a connection outside the scope of the restriction even once, the CPU 21 refuses the connection to the target apparatus 40 and executes a sanction on the image forming apparatus 60. However, the present invention is not limited to executing the above-mentioned measures with a connection outside the scope of the restriction once, and the CPU 21 may execute the above-mentioned measures in a case where the connection outside the scope of the restriction is made a predetermined number of times or more. Further, the CPU 21 may subtract the evaluation value in a case where the connection to the target apparatus 40 made by the image forming apparatus 60 is outside the scope of the restriction indicated by the restriction information, and may execute the above-mentioned measures in a case where the total of the evaluation values is less than a predetermined value. Further, the CPU 21 may make a difference between subtracting the evaluation value and executing the above-mentioned measures without subtracting the evaluation value, depending on content of the connection made by the image forming apparatus 60 outside the scope of the restriction.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      determine whether a connection request from a new apparatus that is not connected to a first information resource connected to a system has been received, wherein a management policy for managing a safety of information is defined for each information resource connected to the system, wherein the management policy comprises restriction information indicating restrictions imposed on the each information resource, the restriction information indicates a restricted state in which a restriction is imposed or an unrestricted state in which the restriction is not imposed;
      in response to determining that the connection request has been received from the new apparatus, set and register restriction information of the new apparatus as a restricted state indicating more restrictions being imposed on the first information resource of which the safety with respect to the system is guaranteed; and
      enable a connection from the new apparatus to the first information resource connected to the system within a scope of the restriction indicated by the registered restriction information.

2. The information processing apparatus according to claim 1, wherein the processor is configured to:
   update the restriction information of the new apparatus from the restricted state to the unrestricted state in a case where a predetermined condition is satisfied.

3. The information processing apparatus according to claim 2,
   wherein the predetermined condition is satisfied in a case where a total of evaluation values for evaluating the safety of the new apparatus exceeds a threshold value.

4. The information processing apparatus according to claim 2,
   wherein the predetermined condition is satisfied in a case where all connections to the first information resource made by the new apparatus from a time at which the connection to the first information resource connected to the system is enabled until a predetermined time elapses are within the scope of the restriction indicated by the restriction information.

5. The information processing apparatus according to claim 3,
   wherein the predetermined condition is satisfied in a case where all connections to the first information resource made by the new apparatus from a time at which the connection to the first information resource connected to the system is enabled until a predetermined time elapses are within the scope of the restriction indicated by the restriction information.

6. The information processing apparatus according to claim 3, wherein the processor is configured to:
   add the evaluation value in a case where the connection to the first information resource connected to the system made by the new apparatus is within the scope of the restriction indicated by the restriction information.

7. The information processing apparatus according to claim 6, wherein the processor is configured to:
   make the evaluation value to be added different depending on content of the connection to the first information resource connected to the system made by the new apparatus.

8. The information processing apparatus according to claim 2,
   wherein a plurality of the restrictions, which are slightly different from each other, are provided, and
   the processor is configured to:
   gradually change from the new apparatus with many restrictions to the new apparatus with few restrictions according to a degree of satisfaction of the predetermined condition.

9. The information processing apparatus according to claim 5,
   wherein a plurality of the restrictions, which are slightly different from each other, are provided, and
   the processor is configured to:
   gradually change from the new apparatus with many restrictions to the new apparatus with few restrictions according to a degree of satisfaction of the predetermined condition.

10. The information processing apparatus according to claim 6,
    wherein a plurality of the restrictions, which are slightly different from each other, are provided, and
    the processor is configured to:
    gradually change from the new apparatus with many restrictions to the new apparatus with few restrictions according to a degree of satisfaction of the predetermined condition.

11. The information processing apparatus according to claim 7, wherein a plurality of the restrictions, which are slightly different from each other, are provided, and the processor is configured to:

gradually change from the apparatus with many restrictions to the new apparatus with few restrictions according to a degree of satisfaction of the predetermined condition.

12. The information processing apparatus according to claim 1, wherein the processor is configured to:

prohibit a subsequent connection from the new apparatus to the first information resource connected to the system in a case where the connection to the first information resource connected to the system made by the new apparatus is outside the scope of the restriction indicated by the restriction information.

13. The information processing apparatus according to claim 2, wherein the processor is configured to:

prohibit a subsequent connection from the new apparatus to the first information resource connected to the system in a case where the connection to the first information resource connected to the system made by the new apparatus is outside the scope of the restriction indicated by the restriction information.

14. The information processing apparatus according to claim 3, wherein the processor is configured to:

prohibit a subsequent connection from the new apparatus to the first information resource connected to the system in a case where the connection to the first information resource connected to the system made by the new apparatus is outside the scope of the restriction indicated by the restriction information.

15. The information processing apparatus according to claim 12, wherein the processor is configured to:

prohibit a connection to the first information resource connected to the system from other apparatuses of the same type as the new apparatus.

16. The information processing apparatus according to claim 1, wherein the processor is configured to:

prohibit a connection from the new apparatus to an outside of the system in a case where the connection to the first information resource connected to the system made by the new apparatus is outside the scope of the restriction indicated by the restriction information.

17. A non-transitory computer readable medium storing an information processing program causing a computer to execute a process comprising:

determining whether a connection request from a new apparatus that is not connected to a first information resource connected to a system has been received, wherein a management policy for managing a safety of information is defined for each information resource connected to the system, wherein the management policy comprises restriction information indicating restrictions imposed on the each information resource, the restriction information indicates a restricted state in which a restriction is imposed or an unrestricted state in which the restriction is not imposed;

in response to determining that the connection request has been received from the new apparatus, setting and registering restriction information of the new apparatus as a restricted state indicating more restrictions being imposed on the first information resource of which the safety with respect to the system is guaranteed; and enabling a connection from the new apparatus to the first information resource connected to the system within a scope of the restriction indicated by the registered restriction information.

18. An information processing method comprising:

determining whether a connection request from a new apparatus that is not connected to a first information resource connected to a system has been received, wherein a management policy for managing a safety of information is defined for each information resource connected to the system, wherein the management policy comprises restriction information indicating restrictions imposed on the each information resource, the restriction information indicates a restricted state in which a restriction is imposed or an unrestricted state in which the restriction is not imposed;

in response to determining that the connection request has been received from the new apparatus, set and register restriction information of the new apparatus as a restricted state more restrictions being imposed on the first information resource of which the safety with respect to the system is guaranteed; and enabling a connection from the new apparatus to the first information resource connected to the system within a scope of the restriction indicated by the registered restriction information.

* * * * *